UNITED STATES PATENT OFFICE.

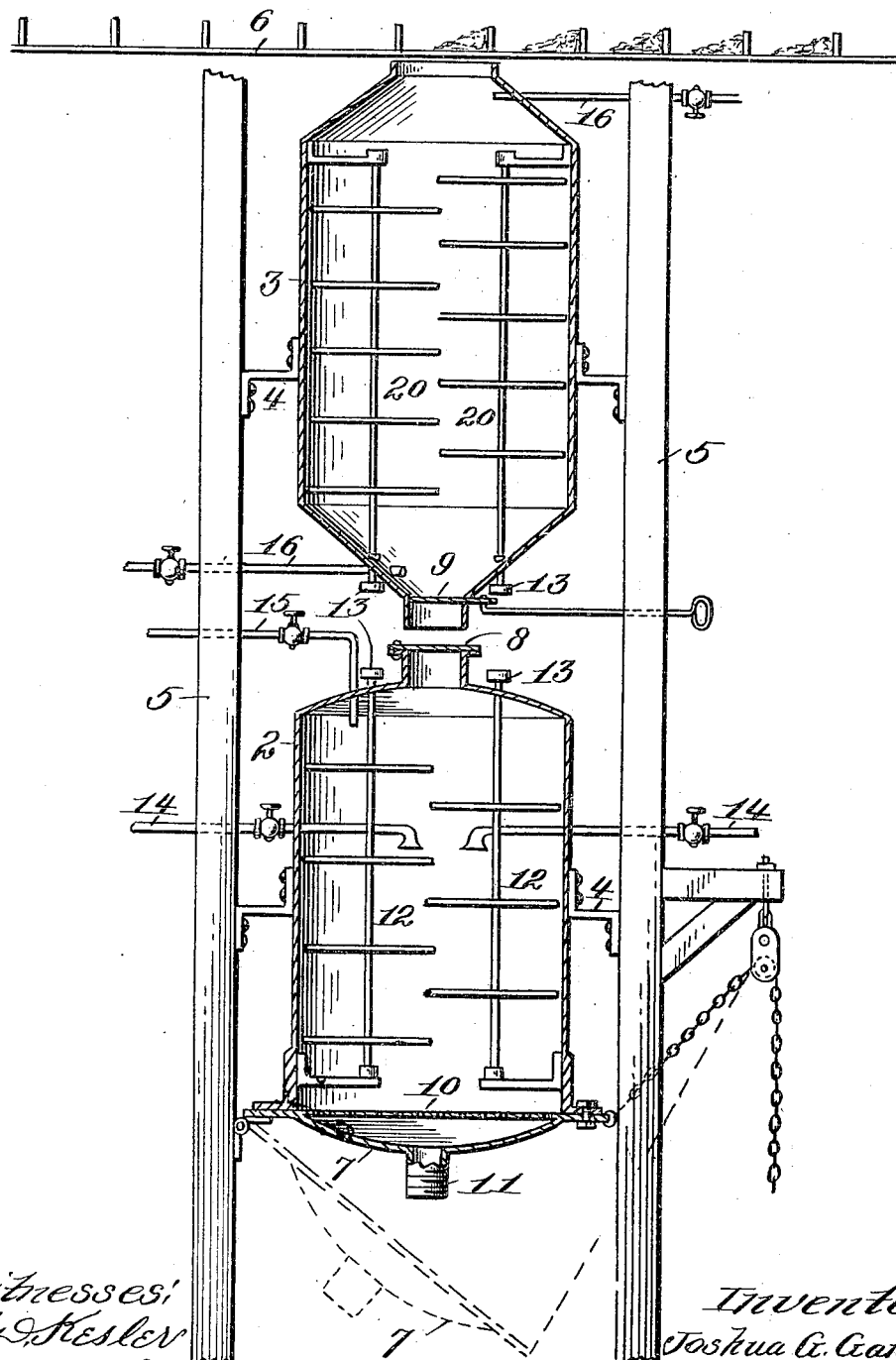

JOSHUA G. GARDNER, OF JACKSONVILLE, FLORIDA, ASSIGNOR TO PURE WHITE TURPENTINE COMPANY, OF JACKSONVILLE, FLORIDA, A CORPORATION OF FLORIDA.

APPARATUS FOR EXTRACTING TURPENTINE FROM WOOD.

No. 808,035.     Specification of Letters Patent.     Patented Dec. 19, 1905.

Original application filed March 11, 1905, Serial No. 249,646. Divided and this application filed April 12, 1905. Serial No. 255,160.

*To all whom it may concern:*

Be it known that I, JOSHUA G. GARDNER, a citizen of the United States, residing at Jacksonville, in the county of Duval and State of Florida, have invented new and useful Improvements in Apparatus for Extracting Turpentine from Wood, of which the following is a specification.

This invention relates to an apparatus for extracting turpentine from wood, the apparatus being adapted especially to the treatment of wood when it is in a condition of sawdust or is ground up.

The apparatus is simple in construction and effective in operation, it serving to rapidly extract a large amount of turpentine as compared with apparatus heretofore in use. By the apparatus I do not destroy any of the valuable properties of the turpentine. Hence I am enabled to secure a product which can be marketed for successful use in combination with paints and varnishes.

In the drawing accompanying and forming a part of this specification I illustrate in sectional elevation an apparatus involving my invention; but I do not restrict myself to the illustration thus made, for certain variations may be adopted within the scope of my claims succeeding the following description, wherein I set forth in detail the structure illustrated in said drawing.

In the drawing I show a retort 2 and a bin 3 above the same, each in the main of cylindrical form. The retort and bin are connected to angle-brackets, as 4, united rigidly in some desirable way to the vertical timbers 5, constituting a convenient framing for carrying the retort and bin.

The sawdust or ground-up wood is supplied in practice in some positive manner to the bin 3, and for this purpose I have illustrated a conveyer, (denoted in a general way by 6,) the conveyer serving to deliver the material through the open top of the retort. After the extraction of the turpentine from the sawdust and after the latter has been removed from the retort 2 such sawdust can be utilized as fuel. The retort 2 has a swinging bottom, as 7, which during the extraction of the turpentine from the mass of sawdust in said retort is closed. The diameter of the swinging bottom is substantially the same as that of the retort, so that when the door or bottom 7 is opened the contents of the retort can be rapidly discharged therefrom. The contents are, in fact, discharged in bulk from the retort. The top of the retort has a neck provided with a horizontally-swinging cover, as 8, which during extraction is also closed, but which will be opened to charge the retort with the sawdust or ground wood from the bin. The capacities of the bin and retort are equal or substantially equal in order to add to the efficiency of the apparatus, for while I am extracting the turpentine from a known quantity of sawdust in the retort I can be supplying to the bin a fresh mass of sawdust and discharge the fresh charge of sawdust into the retort without waste. In the bottom of the bin I arrange a valve, the valve being denoted by 9 and being of the sliding type. The valve will of course be closed when the sawdust is being delivered into the bin.

The retort has a false bottom 10 connected with the drop-down door 7, but spaced from the same. The mass in the retort is sustained directly by the false bottom, the latter being of perforated or foraminous material, so as to provide for the passage of the vapor therethrough, which is laden with the turpentine, the vapor passing through a nipple or pipe section 11, connected centrally with the drop-down door 7. An attachable connection (not illustrated) will in practice be united with the nipple or pipe section 11, the latter being shown as externally threaded for the union.

I subject the sawdust mass in the retort while the process is being carried on to agitation and for this purpose employ several stirrers, (generally three.) Each stirrer is denoted in a general way by 12 and consists of a vertically-disposed shaft having paddles thereon, the paddles being located at suitable intervals and being of such character that when each shaft has made a full turn the mass in the bin will be thoroughly stirred or loosened up. The lower ends of the shafts of the stirrers are stepped in bearings located near the bottom or drop-down door of the retort. The upper portions of the shafts extend through the top of the retort and carry wheels, which may be band-wheels, sprocket-wheels, or something of an equivalent nature, as 13, by which the said stirrers or agitators can be operated. In action the blades or paddles of the stirrers will overlap at the vertical central line of the retort.

Leading into the retort, substantially midway of the height thereof, are one or more steam-pipes, as 14, having their delivery ends arranged to deliver downwardly jets of steam, each pipe having a valve for controlling the flow of steam. Through the top of the retort a valved steam-pipe, as 15, is led, having its delivery end downwardly extended.

Into the bin 3 I extend steam-pipes 16, the delivery end of the upper one being located near the receiving end of said bin, while the delivery end of the lower pipe is located near the discharge end of the said bin. The steam from the two pipes flowing into the bin thoroughly saturates the sawdust or ground wood in the retort, while the jet of steam from the upper pipe 16 so acts as to strike the dust as it drops into said bin, by reason of which the saturation of the sawdust in the bin is one that can be accomplished in a comparatively short space of time. When the sawdust is thoroughly saturated, this will be indicated by the odor thereof, at which point the steam is cut off from the pipes 16 and naturally from the bin.

By the preliminary saturation I bring out the turpentine or soften or cook the wood, so that when the mass is delivered into the retort the extracting step is one that can be accomplished in a short space of time. When the sawdust is thoroughly saturated, the top or cover 8 of the retort 2 is opened and the valve 9 opened wide, so as to permit the saturated mass of sawdust or ground wood in the bin to drop bodily therefrom and in a heated condition into the retort. By the arrangement of steam-piping I heat and saturate every particle of dust as it enters the bin. After having admitted the saturated and heated mass of dust into the retort 2 I open the valves in the several pipes 14 and 15, the steam from the pipes passing through the mass of previously-heated dust from the sides and from the top downward, the vapor laden with turpentine passing through the perforated false bottom 10 and out through the outlet-pipe 11. When the mass in the retort 2 is thoroughly saturated, I cut off the steam from the pipes 14, but permit the steam to flow through the pipe 15 and entirely through the mass. In order that the steam admitted into the retort shall reach every part of the contents thereof, I utilize the stirrers 12, which while the steam is being admitted are in motion, so as to thoroughly agitate or loosen up the mass in order to permit the steam to strike every particle thereof. Should there be any tendency of the mass to arch, the stirrers will break the arch. After the turpentine has been thoroughly extracted from the sawdust or ground wood in the retort I open the hinged bottom or drop-down door 7 and permit the entire contents of the retort to fall out at once or in bulk.

Ordinarily I arrange within the bin 3 stirrers or agitators, (each designated in a general way by 20,) which are substantially like the agitators 12, hereinbefore described in detail. The agitators 20, as will be obvious, prevent arching of the ground-up mass in the bin, so as to assure the instantaneous discharge of said bin when the valve of said bin is opened.

I desire to state at this point that I adopted the title for my invention simply for convenience. I have described the apparatus as utilized for the extraction of turpentine from wood. I do not, however, restrict myself in this particular, for the apparatus can be employed for extracting other volatile substances and by-products from ground-up wood. One of these volatile products is methyl alcohol.

By the invention I secure highly-volatile products, such as turpentine and alcohol, in a clean pure condition, ready for the market immediately after leaving the apparatus or after the cessation of the process. I have found that the color of the by-products of wood is regulated entirely by the temperature. When the heat of the steam is substantially 212° Fahrenheit, only the water-color acids—turpentine and methyl alcohol—come over. The water-color products come over between 212° and 225° Fahrenheit, and from 225° to 250° Fahrenheit they begin to get yellow and the pyroligneous acids come over. At 50° Fahrenheit more the gases come over—such, for example, as marsh-gas. At 50° Fahrenheit more the wood-oils come over. From 380° to 400° Fahrenheit all the by-products leave the wood and are entirely black, such as pitch and tar.

The apparatus hereinbefore described has been set forth as including a retort, as 2, and a bin, as 3, arranged over the retort. I prefer to use both of these vessels or receptacles in practice, the bin being used to prepare the sawdust or ground-up wood in the best possible condition for the subsequent extraction of the turpentine from said wood. The preliminary treatment of and the extraction of turpentine from the wood can both take place in a single vessel, such as the retort 2. This retort stands vertical, or substantially so, and it has, as indicated, a drop-down door. When the door is swung open, as shown by dotted lines in the drawing, the contents of the lower vessel or retort can be discharged bodily or en masse, which is an important consideration. When the mass in the vessel or retort 2 is subjected to steaming, I find that the steam packs the sawdust, and I have found it a difficult matter without the employment of the door to effect the removal of the sawdust or ground-up wood from said retort. By opening the door, however, I can discharge the contents of the retort or vessel, even should the charge therein be several tons, in a trifle over one minute, whereby a great saving of time is assured.

Within the retort or vessel 2 I arrange, as indicated hereinbefore, agitating means. The agitating means is of such a character that not only does it agitate the sawdust mass, but it upholds or acts as a rest for the same and prevents it solidifying, as in case it did it would be a difficult matter to force steam therethrough. Really the agitating means presents a series of vertically-disposed rests, which in the present instance consist of horizontally-disposed blades for the material. When, however, the agitating-blades are set in motion, they form cavities in the mass in which the steam can enter, the steam following up the agitating means, and thereby reaching every particle of the comminuted substance.

I find by experiment that I cannot obtain rapid work by forcing steam upwardly through the mass, but, on the contrary, I am enabled to secure rapid extraction of turpentine from such mass by projecting the steam therethrough in a downward direction. As a matter of fact, I have been able to extract turpentine from wood in as low as half an hour.

The drop-down door when shut fits in an air-tight manner against the lower edge of the retort or lower vessel, and it has as a part thereof a perforated plate, strainer, or trap 10 upon which the sawdust mass is directly sustained. This perforated plate permits the steam laden with turpentine-vapors to pass freely therethrough and into the outlet 11 for conveyance to a condenser; but at the same time it prevents the passage of sawdust into said outlet 11.

The drop-down bottom 7 is shown as being of concavo-convex form or of dished disk shape, so as to present within it an open steam-chamber, the surface of which is defined by the bottom and perforated plate.

I have shown several steam-pipes, as 14 and 15, leading into the retort, the pipe 15 leading into said retort through the top thereof, while the pipes 14 lead through the side of said retort and all of them, as will be clearly seen upon an inspection of the drawing, deliver steam in a downward direction or toward the bottom 7.

The method of extracting volatile substances from wood is not claimed herein, but forms the basis of another application, filed March 11, 1905, Serial No. 249,646, of which the present application is a division.

Having thus described my invention, what I claim is—

1. An apparatus of the class described involving a vertically-disposed vessel having a drop-down door provided with a perforated plate, the door and plate being separated to provide a steam-chamber, the door having an outlet for vapors and the plate serving to sustain a mass of sawdust or ground wood in the retort, means for directing steam in a downward direction through the retort, and means in the vessel for positively opening up paths for the steam.

2. An apparatus of the class described involving a vessel provided with an outlet for vapors and a perforated plate to support the sawdust or ground-wood mass in the vessel, the plate serving to prevent the passage of the sawdust or ground wood into the outlet, means for directing steam downwardly through the mass and through said plate into the outlet, and means in the vessel for opening up paths for the steam.

In testimony whereof I have hereunto set my hand in presence of two subscribing witnesses.

JOSHUA G. GARDNER.

Witnesses:
CHAS. H. SMITH,
ROY L. BISHOP.